(12) United States Patent
Zhuang et al.

(10) Patent No.: US 11,307,032 B2
(45) Date of Patent: Apr. 19, 2022

(54) LASER LEVEL

(71) Applicant: Zhejiang Rongsheng Tools Co., Ltd, Zhejiang (CN)

(72) Inventors: Zhiwei Zhuang, Zhejiang (CN); Jianrong Qian, Zhejiang (CN)

(73) Assignee: Zhejiang Rongsheng Tools Co., Ltd, Zhejiang (CN)

( * ) Notice: Subject to any disclaimer, the term of this patent is extended or adjusted under 35 U.S.C. 154(b) by 195 days.

(21) Appl. No.: 16/710,417

(22) Filed: Dec. 11, 2019

(65) Prior Publication Data

US 2020/0182616 A1 Jun. 11, 2020

(30) Foreign Application Priority Data

Dec. 11, 2018 (CN) .......................... 201822079333.4

(51) Int. Cl.
*G01C 15/00* (2006.01)
(52) U.S. Cl.
CPC .................................. *G01C 15/008* (2013.01)
(58) Field of Classification Search
None
See application file for complete search history.

(56) References Cited

U.S. PATENT DOCUMENTS

| | | | | |
|---|---|---|---|---|
| 5,713,135 A * | 2/1998 | Acopulos | ................. | G01B 3/56 33/1 PT |
| 6,763,598 B1 * | 7/2004 | Chen | ........................ | G01C 5/02 33/286 |
| 6,941,665 B1 * | 9/2005 | Budrow | ............... | G01C 15/008 33/286 |
| 7,690,124 B1 * | 4/2010 | Henry | .................. | G01C 15/004 33/286 |
| 8,522,446 B1 * | 9/2013 | Staudt | ...................... | G01C 9/32 33/348.2 |
| 2003/0014872 A1 * | 1/2003 | Chen | .................... | G01C 15/004 33/286 |
| 2004/0221462 A1 * | 11/2004 | Liao | ...................... | G01C 15/008 33/286 |
| 2005/0044735 A1 * | 3/2005 | Liao | ...................... | G01C 15/008 33/286 |
| 2005/0044736 A1 * | 3/2005 | Liao | ...................... | G01C 15/008 33/286 |

(Continued)

FOREIGN PATENT DOCUMENTS

GB 2422010 A * 7/2006 .......... G01C 15/004

*Primary Examiner* — Christopher W Fulton
(74) *Attorney, Agent, or Firm* — Scully Scott Murphy & Presser

(57) ABSTRACT

A laser level is provided. The laser level has a housing and a laser inside the housing. The laser level also has a laser fixing plate and a front cover plate. The laser is disposed in a mounting slot of the laser fixing plate. A sliding block is disposed in a space formed between the laser fixing plate and the front cover plate. A minus-shaped laser beam splitter and a cross-shaped laser beam splitter are disposed on the sliding block in a vertical direction. Both sides of the sliding block are further respectively provided with a sliding block pusher disposed in a way of passing through two sides of the housing. The sliding block pushers can move the sliding block in the vertical direction. The laser level can achieve positional exchange between the minus-shaped laser beam splitter and the cross-shaped laser beam splitter.

7 Claims, 3 Drawing Sheets

B-B

(56) References Cited

U.S. PATENT DOCUMENTS

| | | | |
|---|---|---|---|
| 2005/0155237 A1* | 7/2005 | Lee | G01C 15/008 33/286 |
| 2005/0206891 A1* | 9/2005 | Khubani | G01C 15/008 356/249 |
| 2006/0112576 A1* | 6/2006 | Lu | G01C 15/002 33/286 |
| 2007/0101593 A1* | 5/2007 | Jang | G01S 7/521 33/286 |
| 2014/0373369 A1* | 12/2014 | Bockem | G01S 17/06 33/228 |

* cited by examiner

B-B

LASER LEVEL

This application claims the benefit of priority to Chinese Patent Application No. 201822079333.4 titled "LASER LEVEL", filed with the Chinese State Intellectual Property Office on Dec. 11, 2018, the entire disclosure of which is incorporated herein by reference for all purposes. No new matter has been introduced.

TECHNICAL FIELD

The application belongs to the technical field of measuring devices, and in particular relates to a laser level.

BACKGROUND

The laser level is a measurement tool that is often used in civil construction, decoration, and installation of items. Due to the limitations of its own profile and size, the laser levels manufactured both at home and abroad can only produce one laser horizontal point and one laser horizontal line. When it is necessary to measure or correct a measured object in the horizon direction, such a level cannot meet the requirements.

SUMMARY

The object of the application is to address at least one of the above defects and shortcomings, and it is realized through the following technical solutions.

A laser level is proposed by the application, which includes a housing and a laser disposed inside the housing, and further includes a laser fixing plate and a front cover plate disposed in sequence in the direction of the outgoing light of the laser, wherein the laser is disposed in a mounting slot of the laser fixing plate, a sliding block is disposed in a space formed between the laser fixing plate and the front cover plate, and a minus-shaped laser beam splitter and a cross-shaped laser beam splitter are disposed on the sliding block in a vertical direction; both sides of the sliding block are further respectively provided with a sliding block pusher disposed in a way of passing through two sides of the housing, the sliding block pushers being capable of moving the sliding block in the vertical direction, thereby utilizing the minus-shaped type laser beam splitter and the cross-shaped laser beam splitter to convert the outgoing light of the laser.

Further, in the laser level of the present application, the laser fixing plate is further provided with a positioning steel ball and a compression spring for positioning the sliding block.

Further, in the laser level of the present application, the sliding block is sequentially provided in a vertical direction with a first positioning groove and a second positioning groove for accommodating the positioning steel ball.

Further, in the laser level of the present application, a laser switch is further disposed at the top of the housing.

Further, in the laser level of the present application, the top of the housing is further provided with a horizontal bubble seat and a turning bubble seat for positioning the laser level.

Further, in the laser level of the present application, the top of the housing is further provided with a bubble lamp switch.

Further, in the laser level of the present application, the bottom of the housing is further provided with a magnet for fixing the housing.

By using the laser level of the present application, the positional exchange between the minus-shaped laser beam splitter and the cross-shaped laser beam splitter can be effectively realized, so that the laser level not only can emit mutually perpendicular cross laser lines perpendicularly projected onto the object, but also emit a minus-shaped laser line that is projected in parallel onto the object.

BRIEF DESCRIPTION OF THE DRAWINGS

Various further advantages and benefits will become apparent to those skilled in the art upon reading a detailed description of the following preferred embodiments. The drawings are only provided for the purpose of illustrating the preferred embodiments, and are not intended to limit of the present application. Throughout the drawings, identical reference numerals are used to denote identical parts.

LIST OF REFERENCE NUMERALS IN THE DRAWINGS

Figure 1:
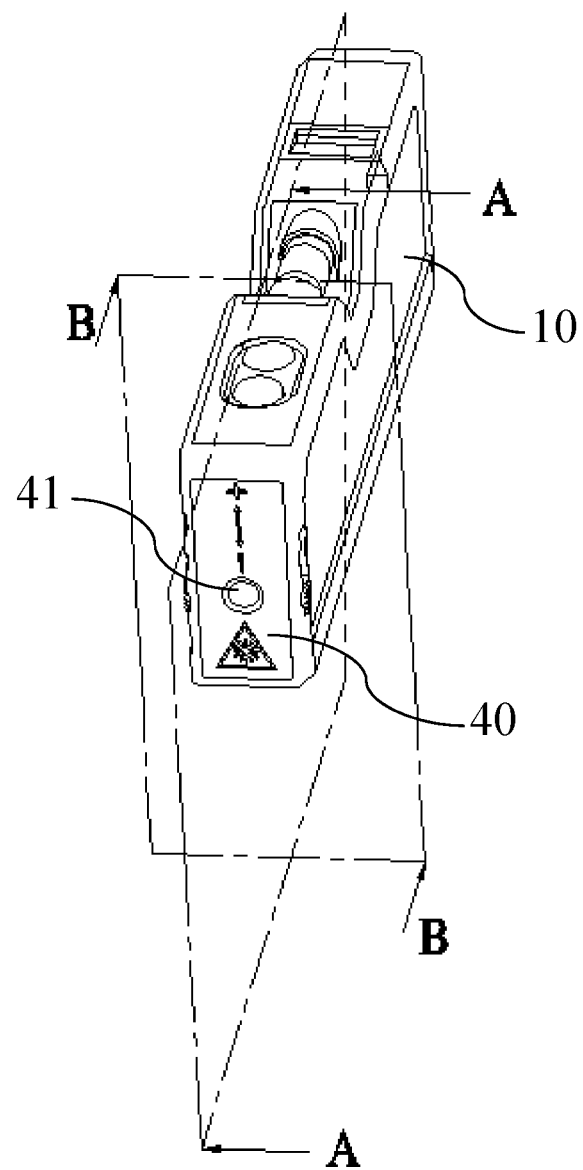
FIG. 1 is a schematic view of the overall structure of the present application.

10: housing; 20: laser; 30; laser fixing plate; 40: front cover plate; 41: light-through hole; 50: sliding block; 51: minus-shaped laser beam splitter; 52: cross-shaped laser beam splitter; 53: sliding block pusher; 54: positioning steel ball; 55: compression spring; 56: first positioning groove; 57: second positioning groove; 60: laser switch; 70: bubble lamp switch; 71: horizontal bubble seat; 72: turning bubble seat; 80: magnet.

DETAILED DESCRIPTION

Exemplary embodiments of the present disclosure will be described in greater detail below with reference to the accompanying drawings. While the exemplary embodiments of the present disclosure are shown in the drawings, it is understood that the present disclosure may be embodied in various forms and is not limited by the embodiments set forth herein. Rather, these embodiments are provided so that the present disclosure will be more fully understood, and the scope of the present disclosure can be fully conveyed to those skilled in the art.

It is to be understood that terms are used herein for the purpose of describing particular exemplary embodiments and are not intended to be limiting. The singular forms "a", "one" and "the" may also refer to plural forms, unless explicitly specified otherwise in the context. The terms "comprise", "contain", "comprising" and "have" are inclusive, and therefore indicate the existence of the recited features, steps, operations, elements and/or components, without precluding the existence or addition of one or more other features, steps, operations, elements, components and/or a combination thereof. The method steps, processes, and operations described herein are not to be construed as necessarily requiring that they are executed in the particular sequence as described or illustrated herein, unless the sequence is explicitly specified. It should also be understood that additional or alternative steps may be used.

Although the terms "first", "second", "third", etc. may be used to describe a plurality of elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms when used in the present disclosure do not imply the sequence or order, unless explicitly specified otherwise in the context. Thus, the first element, component, region, layer or section may be referred to as the second element, component, region, layer or section without departing from the teachings of the exemplary embodiments.

For convenience of description, terms indicating spatial relative relationship may be used herein to describe the relationship of one element or feature as shown in the drawings with respect to another element or feature, such as "internal", "external", "inside", "outside", "beneath", "below", "on top of", "above", etc. Such terms indicating spatial relative relationship are intended to encompass different orientations of devices in use or in operation in addition to the orientation depicted in the drawings. For example, if the device in the drawings is turned over, the element described as "below another element or feature" or "beneath another element or feature" would then be oriented "above another element or feature" or "on top of another element or feature". Thus, the exemplary term "below" can encompass both orientations of "above" and "below". The device can be otherwise oriented (rotated by 90 degrees or oriented in other directions) and the spatial relative relationship descriptors used in the context are interpreted accordingly.

Figure 2:
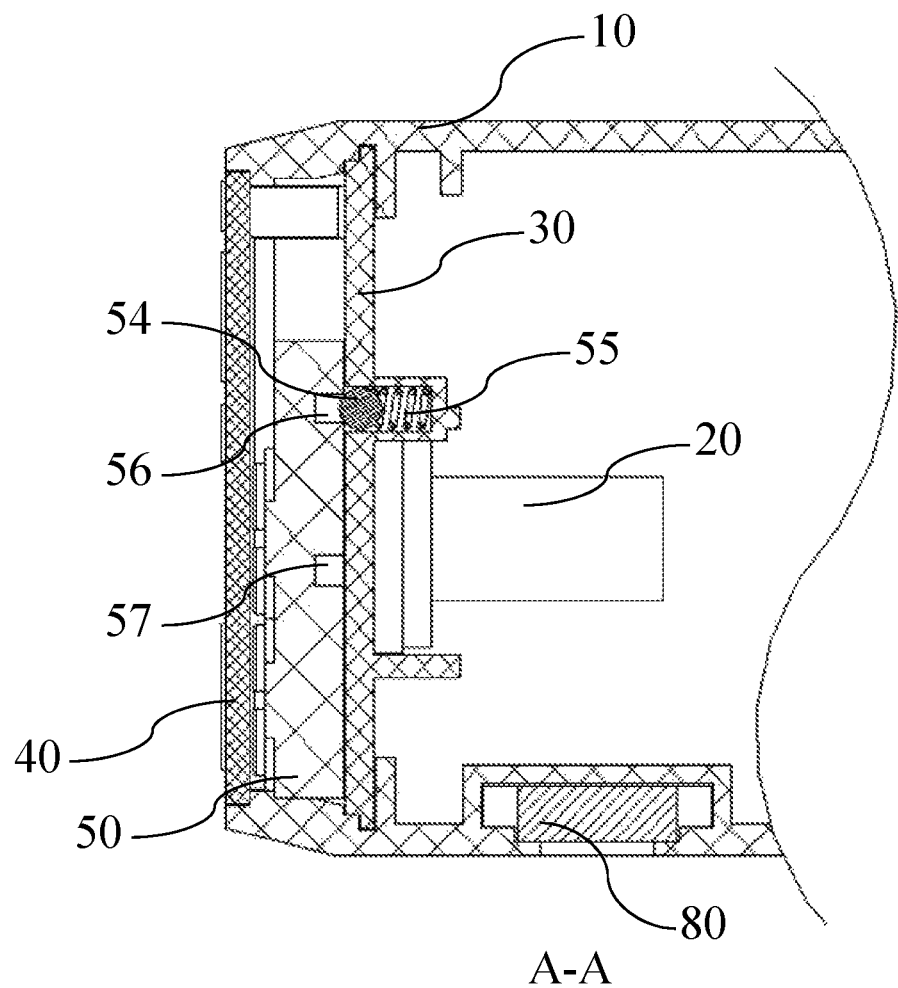
FIG. 2 is a schematic cross-sectional view taken along line A-A in the embodiment shown in FIG. 1.
Figure 3:
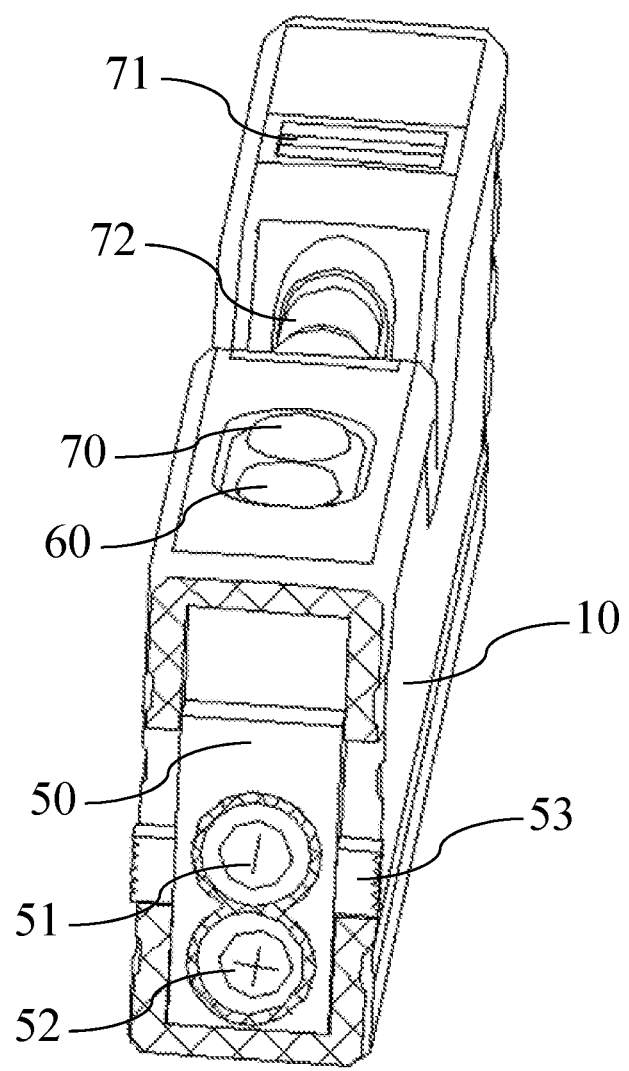
FIG. 3 is a schematic cross-sectional view taken along line B-B in the embodiment shown in FIG. 1.

FIG. 1 is a schematic view of the overall structure of the present application; FIG. 2 is a schematic cross-sectional view taken along line A-A in the embodiment shown in FIG. 1; and FIG. 3 is a schematic cross-sectional view taken along line B-B in the embodiment shown in FIG. 1. As shown, the laser level according to the embodiment includes a housing 10 and a laser 20 disposed inside the housing 10, and further includes a laser fixing plate 30 and a front cover plate 40 disposed in sequence in the direction of the outgoing light of the laser 20, wherein the laser 20 is disposed in a mounting slot of the laser fixing plate 30, a sliding block 50 is disposed in a space formed between the laser fixing plate 30 and the front cover plate 40, and a minus-shaped laser beam splitter 51 and a cross-shaped laser beam splitter 52 are disposed on the sliding block 50 in a vertical direction; both sides of the sliding block 50 are further respectively provided with a sliding block pusher 53 disposed in a way of passing through two sides of the housing 10, the sliding block pushers 53 being capable of moving the sliding block 50 in the vertical direction, thereby utilizing the minus-shaped laser beam splitter 51 and the cross-shaped laser beam splitter 52 to convert the outgoing light of the laser 20.

In the embodiment, the minus-shaped laser beam splitter 51 and the cross-shaped laser beam splitter 52 are disposed on the sliding block 50, and by moving the sliding block pushers 53, the sliding block 50 is moved in the vertical direction so that the minus-shaped laser beam splitter 51 and the cross-shaped laser beam splitter 52 are utilized to convert the outgoing light of the laser 20. Meanwhile, the front cover plate 40 is disposed at the front end of the sliding block 50, and the front cover plate 40 is provided with a light-through hole 41 coaxially arranged with the laser 20. The front cover plate 40 can effectively protect the minus-shaped laser beam splitter 51 and the cross-shaped laser beam splitter 52 in the sliding block 50, and the arrangement of the sliding block pushers 53 enable a more convenient and swift switch of the positions of the minus-shaped laser beam splitter 51 and the cross-shaped laser beam splitter 52.

Further, in order to position the converted positions of the minus-shaped laser beam splitter 51 and the cross-shaped laser beam splitter 52, the laser fixing plate 30 is also provided with a positioning steel ball 54 and a compression spring 55 for positioning the sliding block 50. Correspondingly, the sliding block 50 is sequentially provided in a vertical direction with a first positioning groove 56 and a second positioning groove 57 for accommodating the positioning steel ball 54.

As shown in FIG. 2, when the first positioning groove 56 mates with the positioning steel ball 54, the positioning steel ball 54 is captured inside the first positioning groove 56 so that the position of the sliding block 50 is fixed. At this point, the minus-shaped laser beam splitter 51 is coaxially disposed with the laser 20, and the outgoing light of the laser 20 is therefore converted into a minus-shaped laser line that is projected in parallel onto the object. When the second positioning groove 57 mates with the positioning steel ball 54, the positioning steel ball 54 is captured inside the second positioning groove 57 so that the position of the sliding block 50 is fixed. At this point, the cross-shaped laser beam splitter 52 is coaxially disposed with the laser 20, and the outgoing light of the laser 20 is therefore converted into mutually perpendicular cross laser lines perpendicularly projected onto the object.

As shown in FIG. 3, a laser switch 60 is further disposed at the top of the laser level of the embodiment. By pressing the laser switch 60, the laser 20 can be turned on so as to emit lights. The top of the housing 10 is further provided with a horizontal bubble seat 71 and a turning bubble seat 72 for positioning the laser level. The horizontal bubble seat 71 can be used for the alignment of the laser level in the horizontal direction, and the turning bubble seat 72 can be used for detecting a specific inclined angle of the laser level.

Further, in order to enable the use of the laser level of the embodiment in a poorly-illuminated environment, the top of the housing 50 is also provided with a bubble lamp switch 70. By pressing the bubble lamp switch 70, a bubble lamp inside the bubble seat can be turned on so as to effect illuminating and facilitate observation.

Further, in order to fix the laser level of the embodiment and prevent positional displacement thereof, the bottom of the housing 10 is also provided with a magnet 80 for fixing the housing 10. By fixing the laser level onto the surface of a fixing seat of a magnetic object, the magnet 80 and the fixing seat are attracted to each other, thus fixing the laser level.

By using the laser level of the present application, the positional exchange between the minus-shaped laser beam splitter and the cross-shaped laser beam splitter can be effectively realized, so that the laser level not only can emit mutually perpendicular cross laser lines perpendicularly projected onto the object, but also emit a minus-shaped laser line that is projected in parallel onto the object.

What have been described above are only specific preferred embodiments of the present application, and the scope of protection of the present application is not limited thereto. Variations and substitutes that can be readily conceived by any person skilled in the art within the technical scope disclosed by the present application are intended to be included within the scope of protection of the present application. Therefore, the scope of protection of the present application should be determined by the scope of protection of the claims.

What is claimed is:

1. A laser level comprising:
   a housing;
   a laser disposed inside the housing and being configured to direct a light beam in a first direction;
   a laser fixing plate;
   a front cover plate comprising a light-through hole aligned with the laser in the first direction, the laser fixing plate and the front cover plate being disposed in sequence in the first direction; and
   a sliding block disposed between the laser fixing plate, the front cover plate and the housing and comprising a minus-shaped laser beam splitter and a cross-shaped laser beam splitter, the sliding block being linearly slidable relative to the laser in a second direction transverse to the first direction between at least a first position and a second position, the minus-shaped laser beam splitter being aligned with the light-through hole when the sliding block is in the first position, the cross-shaped beam splitter being aligned with the light-through hole when the sliding block is in the second position, the sliding block comprising a sliding block pusher extending through a corresponding side wall opening of the housing in a third direction transverse to the first and second directions and translatable relative to the sidewall opening of the housing in the second direction between the at least the first position and the second position to linearly slide the sliding block between at least the first position and the second position.

2. The laser level according to claim 1, wherein the laser fixing plate is further provided with a positioning steel ball and a compression spring for positioning the sliding block.

3. The laser level according to claim 2, wherein:
   the sliding block comprises a first positioning groove corresponding to the first position and a second positioning groove corresponding to the second position, the first and second positioning grooves being configured to accommodate the positioning steel ball; and
   the positioning steel ball, when accommodated in one of the first and second positioning grooves, is configured to inhibit the linear sliding of the sliding block in the second direction.

4. The laser level according to claim 1, wherein a laser switch is further disposed at the top of the housing.

5. The laser level according to claim 1, wherein the top of the housing is further provided with a horizontal bubble seat and a turning bubble seat for positioning the laser level.

6. The laser level according to claim 5, wherein the top of the housing is further provided with a bubble lamp switch.

7. The laser level according to claim 1, wherein the bottom of the housing is further provided with a magnet for fixing the housing.

* * * * *